United States Patent [19]

Constant

[11] Patent Number: 4,770,011
[45] Date of Patent: Sep. 13, 1988

[54] ASSEMBLY FOR RELEASABLY LOCKING A BICYCLE WHEEL TO THE FRAME

[76] Inventor: Guy R. Constant, 475 Autumn Ave., Cypress Hills, Brooklyn, N.Y. 11208

[21] Appl. No.: 79,432

[22] Filed: Jul. 30, 1987

[51] Int. Cl.⁴ .............................................. E05B 71/00
[52] U.S. Cl. ........................................ 70/225; 70/233; 301/111
[58] Field of Search ............ 70/225, 226, 233, DIG. 9; 301/105 B, 111–113

[56] References Cited

U.S. PATENT DOCUMENTS

| 687,768 | 12/1901 | Mecklan | 301/112 |
| 3,606,475 | 9/1971 | Quisenberry | 301/112 |
| 3,871,710 | 3/1975 | Dian et al. | 301/105 B |
| 4,028,915 | 6/1977 | Stahl | 70/233 |
| 4,114,409 | 9/1978 | Scire | 70/230 X |
| 4,424,981 | 1/1984 | Maxwell | 301/105 B |
| 4,567,973 | 2/1986 | Butz | 301/105 B X |
| 4,621,873 | 11/1986 | Weinstein et al. | 70/230 X |

FOREIGN PATENT DOCUMENTS

| 1041203 | 5/1953 | France | 301/111 |
| 1112669 | 11/1955 | France | 70/233 |
| 1312545 | 11/1962 | France | 301/105 B |
| 423491 | 7/1947 | Italy | 301/111 |
| 460495 | 11/1950 | Italy | 301/111 |

*Primary Examiner*—Lloyd A. Gall
*Attorney, Agent, or Firm*—Kane, Dalsimer, Sullivan, Kurucz, Levy, Eisele and Richard

[57] ABSTRACT

Disclosure is made of an assembly for releasably locking a bicycle wheel mounted within the wheel fork of a bicycle frame. The assembly includes a mounting rod spanning the axle bore and having first and second extensions. The first extension has a length sufficient to receive thereof one tine of the frame fork, a spacer element, and a lock. The second extension includes a pivotal rod stop enclosed by a cover housing.

9 Claims, 4 Drawing Sheets

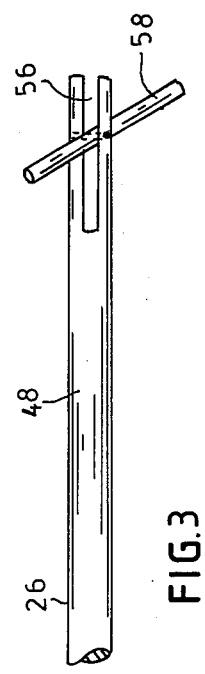
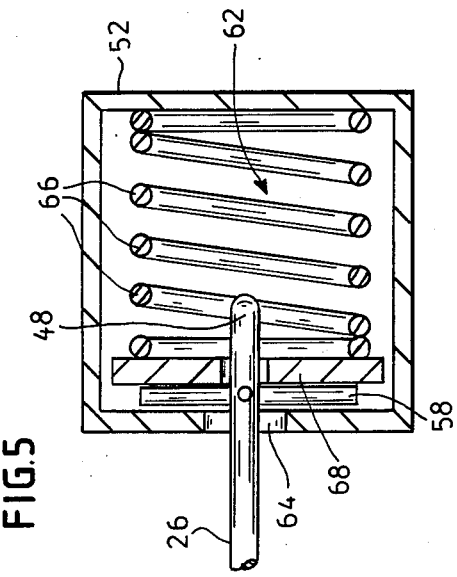
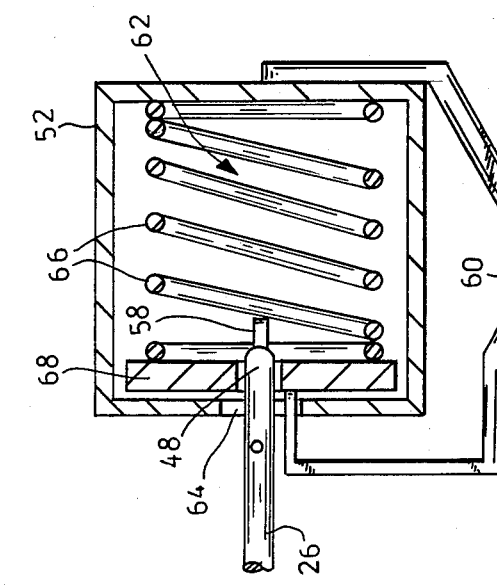
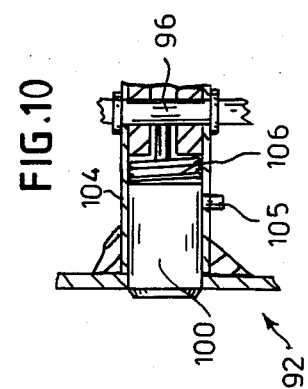
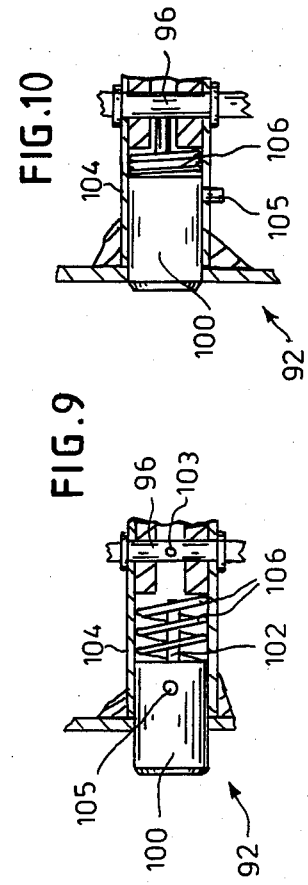

ASSEMBLY FOR RELEASABLY LOCKING A BICYCLE WHEEL TO THE FRAME

BACKGROUND OF THE INVENTION

1. Field of the Invention

The invention relates to bicycle wheel locks and more particularly relates to an assembly for releasably locking a bicycle wheel within the wheel fork of the bicycle frame.

2. Brief Description of the Prior Art

A wide variety of security devices have been produced with the objective of preventing the theft of wheels from bicycles left unattended. Representative of such devices are those described in the U.S. Pat. Nos. 4,114,409 and 4,621,873.

In spite of the wide variety of locking devices, wheels continue to be stolen even when so protected because of inadequacies in the devices, skill of the thief in circumventing the device or a combination of these factors.

The assembly of the present invention is deemed to be an improved assembly for securing the bicycle wheel to the frame mount.

SUMMARY OF THE INVENTION

The invention comprises an assembly for releasably locking a bicycle wheel mounted within the wheel fork of a bicycle frame, said wheel comprising:

(A) a wheel rim supported on an axle having first and second ends and an axle body between the first and second axle ends, by integral, spaced apart, first and second wheel hubs located at the first and second axle ends, respectively;

said axle having an interior axle bore traversing the length of the axle, said bore being open at the first and second ends of the axle;

(B) first means cooperating with the first hub for partially closing the open bore at the first end of the axle; and (C) second means cooperating with the second hub for partially closing the open bore at the second end of the axle;

which assembly comprises:

(1) a mounting rod adapted by size and configuration to fit within the axle bore, spanning the length of the axle bore and the integral first and second hubs, said rod having
  (a) a first end;
  (b) a second end;
  (c) a rod body extending continuously between the first and second ends of the rod;
  (d) first means located on the rod body adjacent the first rod end, for cooperating with the first means for partially closing the first end of the axle bore to fixedly mount the rod at the first hub;
  (e) second means located on the rod body adjacent the second rod end, for cooperating with the second means for partially closing the second end of the axle bore to fixedly mount the rod at the second hub;
  said first and second means to fixedly mount the rod, together serving to fixedly mount the rod within the axle bore and the first and second hubs;

(2) a mounting rod first extension, integral with the first end of the rod and projecting outwardly beyond the first hub when the rod is mounted in the axle bore and the first hub, said first extension having a length sufficient to receive thereon one tine of the frame fork, a spacer element as described hereinafter and a locking means as described hereinafter, said first extension including means for cooperating with said locking means for movement of the locking means along a portion of the first extension length;

(3) a mounting rod second extension, integral with the second end of the rod and projecting outwardly beyond the second hub when the rod is mounted in the axle bore and second hub, said second extension having (a) a length sufficient to receive thereon one tine of the frame fork and a means for covering the second extension, (b) a transverse bore through the extension, and (c) a rod stop movably mounted on the second extension so as to move from a first position substantially within the transverse bore to a second position partly within and partly out of the transverse bore, said rod stop having
  (i) a first end;
  (ii) a second end;
  (iii) a mounting point located between the first and the second ends of the rod stop;

(4) said spacer element being a body having a length, a width and a height adapted by size and configuration to mount on the first rod extension and to space apart the lock and a tine of the frame fork;

(5) said means for covering the second extension of the mounting rod comprising
  (a) a housing enclosing and defining an interior chamber of a dimension sufficient to receive and cover the second extension of the mounting rod, said housing having an aperture in one sidewall thereof, of a size and configuration to receive the second extension of the mounting rod into the interior chamber, including the rod stop when in the first position but which will not permit passage of the second extension into said chamber when the rod stop is in the second position; said rod stop being movable from the first to the second position when the rod stop is located within the interior chamber defined by the housing;
  (b) means on the housing for securing the means for covering, over the second extension, in cooperation with the lock; and
  (c) means within the chamber for urging the rod stop, when in the second position, against the housing and towards the first extension of the mounting rod;

(6). said locking means comprising
  (a) a locking means housing defining an interior chamber having a first zone for the containment of a lock mechanism and a second zone for the containment of the portion of the first extension of the mounting rod having the means for cooperating with the locking means for movement of the locking means along a portion of the first extension length, said housing having a first opening for receiving the first rod extension into the second zone and a second opening into the first zone;
  (b) a lock mechanism mounted in the first zone and closing the second opening, said mechanism including (i) a shaft rotatably mounted in the housing, said shaft having an upper end and a lower end;
(ii) lock means for releasably maintaining the shaft in a locked, non-rotatable position;
(iii) means of releasing the shaft from the locked, non-rotatable position enabling the shaft to rotate freely; and
(iv) means for rotating the shaft into a locked position;

said shaft being in association with the first extension of the mounting rod for cooperation with the first extension of the mounting rod, whereby when the shaft is rotated to the locked, non-rotatable position the lock housing moves relative to the fixed mounting rod towards the bicycle frame to lock the wheel to the bicycle frame, and whereby when the shaft is released from the locked, non-rotatable position and moved away from the non-rotatable position, the lock housing moves relative to the fixed mounting rod away from the bicycle frame, releasing and allowing removal of the mounted wheel.

The invention also comprises a kit for conversion of a conventional bicycle wheel mounting to include the assembly of the invention.

BRIEF DESCRIPTION OF THE DRAWINGS

FIG. 3 is an enlarged view of the second extended end of the mounting rod component of the assembly of the invention shown in FIG. 1.

FIG. 4 is a cross-sectional side view of an embodiment cover means for the extended end of the rod shown in FIG. 3, unmounted, with a tool for its installation and removal.

FIG. 5 is a view as in FIG. 4, after installation and mounting.

FIG. 9 is a view in partial cross-section of the means for blocking rotation of the locking means shown in FIG. 6.

FIG. 10 is a view as in FIG. 9, with the locking means blocked.

DETAILED DESCRIPTION OF THE PREFERRED EMBODIMENTS OF THE INVENTION

Those skilled in the art will readily gain an appreciation of the invention from the following description of preferred embodiments of the invention, when read in conjunction with the accompanying drawings of FIGS. 1-8, inclusive.

Figure 1:
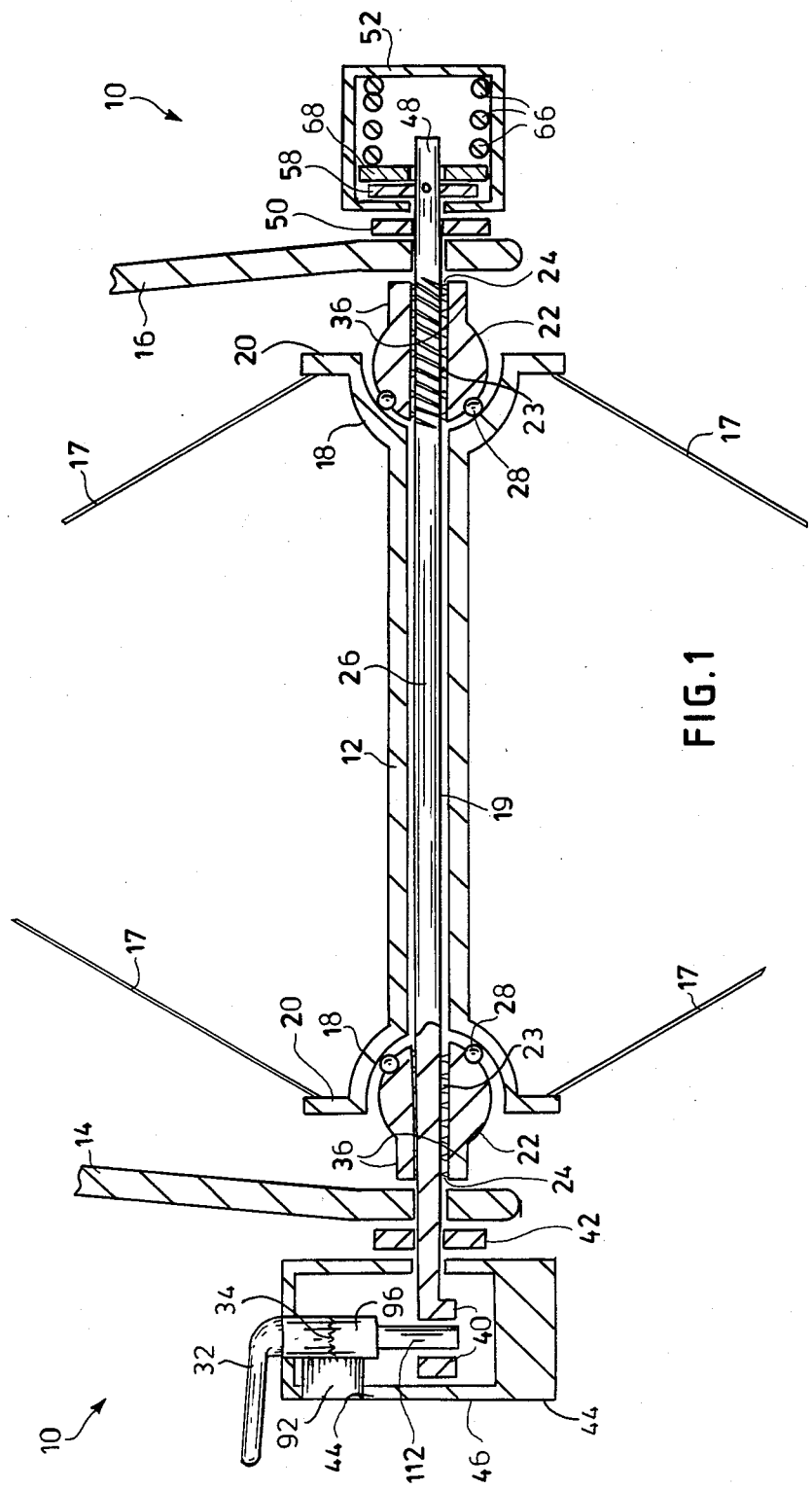
FIG. 1 is a cross-sectional side view of a preferred embodiment assembly of the invention shown locking a bicycle wheel within the wheel fork of a bicycle frame.
Figure 2:
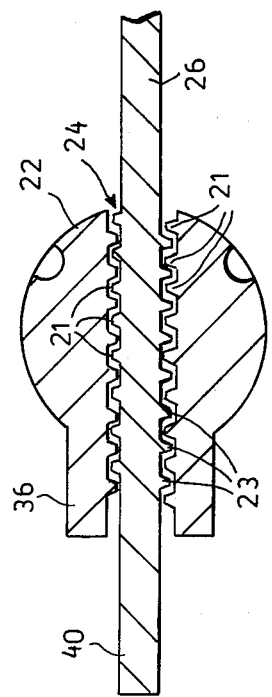
FIG. 2 is an enlarged, cross-sectional side view of the hub portion shown in FIG. 1.

Referring first to FIG. 1, a cross-sectional side elevation of a preferred embodiment assembly 10 of the invention is shown with a bicycle wheel (axle 12 portion of wheel shown) within the front wheel fork tines 14,16 of a conventional bicycle frame. As will be appreciated by those skilled in the art, conventional bicycle wheels comprise a wheel rim (not shown in FIG. 1) supported on an axle 12 having first and second axle ends and an axle body between the first and second axle ends. The circular wheel rim is connected to and supported on the axle 12 by a plurality of spokes 17 or a disc through the agency of a pair of wheel hubs 18 integrally formed at each free end of the axle 12. In the FIG. 1, only a few spokes 17 are shown, fragmented, to simplify the drawing. The two wheel hubs 18 are spaced apart laterally from each other by the span of the intervening axle 12 body. As shown in FIG. 1, the axle 12 is a hollow, elongate body having an interior axle bore 19 traversing the length of the axle 12 and open at the first and second ends of the axle at the hubs 18 location. Outwardly projecting flanges 20 on the periphery of hubs 18 provide a point attachment for the plurality of radial spoker 17. Partially closing the open bore 19 at the axle ends are hub caps 22 which are removably engaged within each of the hubs 18. Each of the hub caps 22 have a bore 24 which is in axial alignment with the bore 19 when the hub caps 22 are placed within hubs 18 as shown in FIG. 1. FIG. 2 is an enlarged view of a hub cap 22, in cross-section and as shown in FIG. 1. The hub caps 22 may be removably secured within hubs 18 by a series of screw threads 21 on the inner walls of bore 24, said screw threads 21 being matingly disposed with a plurality of mating screw threads 23 on the ends of the mounting rod 26. Mounting rod 26 traverses the entire length of the bore 19 and the bore 24 at each hub 18 end of the axle 12. The axle 12 is free to rotate about hub caps 22, preferably on a plurality of radially disposed ball bearings 28. The hub caps 22 function as a means to support the mounting rod 26 and also as means cooperating with the hubs 18 for partially closing the open bore 19 at each end adjacent to each of the hubs 18. The wrench engaging surfaces 36 may be integrally formed on the outer surface of each hub cap 22 for facilitating threading the hub caps 22 into the hubs 18 on the threaded 23 ends of mounting rod 26.

As shown in FIG. 1, a first extended end 40 of mounting rod 26 extends outwardly beyond the one hub cap 22 to receive thereon a single tine 14 of the wheel fork, a spacer 42 and a locking means assembly 44. The first extension 40 terminates within a housing 46 described in more detail hereafter. The opposite of the mounting rod 26 also includes an integral extension 48 bearing on its length a spacer 50 and a protective cap 52 which will be described in greater detail hereinafter, together with a tine 16 of the bicycle wheel fork. The assembly 10 will hold in locked relationship the bicycle wheel within its mounting in the fork of the bicycle frame.

FIG. 3 is an enlarged view of the second extended end 48 of the mounting rod 26 component of the assembly 10 of the invention shown in FIG. 1. The end 48 bears a transverse bore 56 through the rod 26 at extended end 48. In the preferred embodiment shown in FIG. 3, the bore splits the rod 26 into two tines of a fork. Mounted by a pin within the bore 56 is a pivotable stop 58 which functions as a rod 26 stop when pivoted out of the confines of the transverse bore 56. The stop 58 has a length substantially in excess of the diameter of rod 26 so that when it is pivotally displaced from the confines of bore 56, it will engage with the cover 52 as described hereinafter, and is a stop means.

Referring now to FIG. 4, there is seen a cross-sectional side view of an embodiment cover means 52 for covering the extended end 48 of rod 26 shown in FIG. 3. In the view of FIG. 4, the cover 52 remains unmounted and there is a tool 60 emplaced for installation of the cover over the end 48 of rod 26. As also shown in FIG. 4, the cover 52 comprises a housing defining an interior chamber 62 having an aperture 64 of a size and configuration to receive the end 48 of rod 26 with stop 58 in a first position within bore 56 and axially aligned with the longitudinal axis of rod 26. Within chamber 62 there is a compressible spring 66 which forces a platen 68 towards aperture 64. To mount the cover 52 on end 48 of rod 26, the tool 60 is used to compress the platen 68 and associated spring 66 within chamber 62, thereby allowing end 48 of rod 26 to be received within chamber 62. When inserted, stop 58 may be pivoted on the mounting pin to a second position wherein the longitudinal axis of stop 58 is perpendicular to the longitudinal axis of rod 26. When in this second position, the spring 66 may be released to force the platen 68 against stop 58 which will be held from withdrawing from chamber 62 by the housing wall of the cover 52. In this position, as shown best in FIG. 5, the rod 26 is pressed towards lock 44 and takes up space between tine 16 and spacer 50 to securely hold the one end of rod 26 in place with the fork portion of the bicycle frame. The spring 66 should have sufficient compression force to hold rod 26 in this position as shown in FIG. 1.

Figure 6:
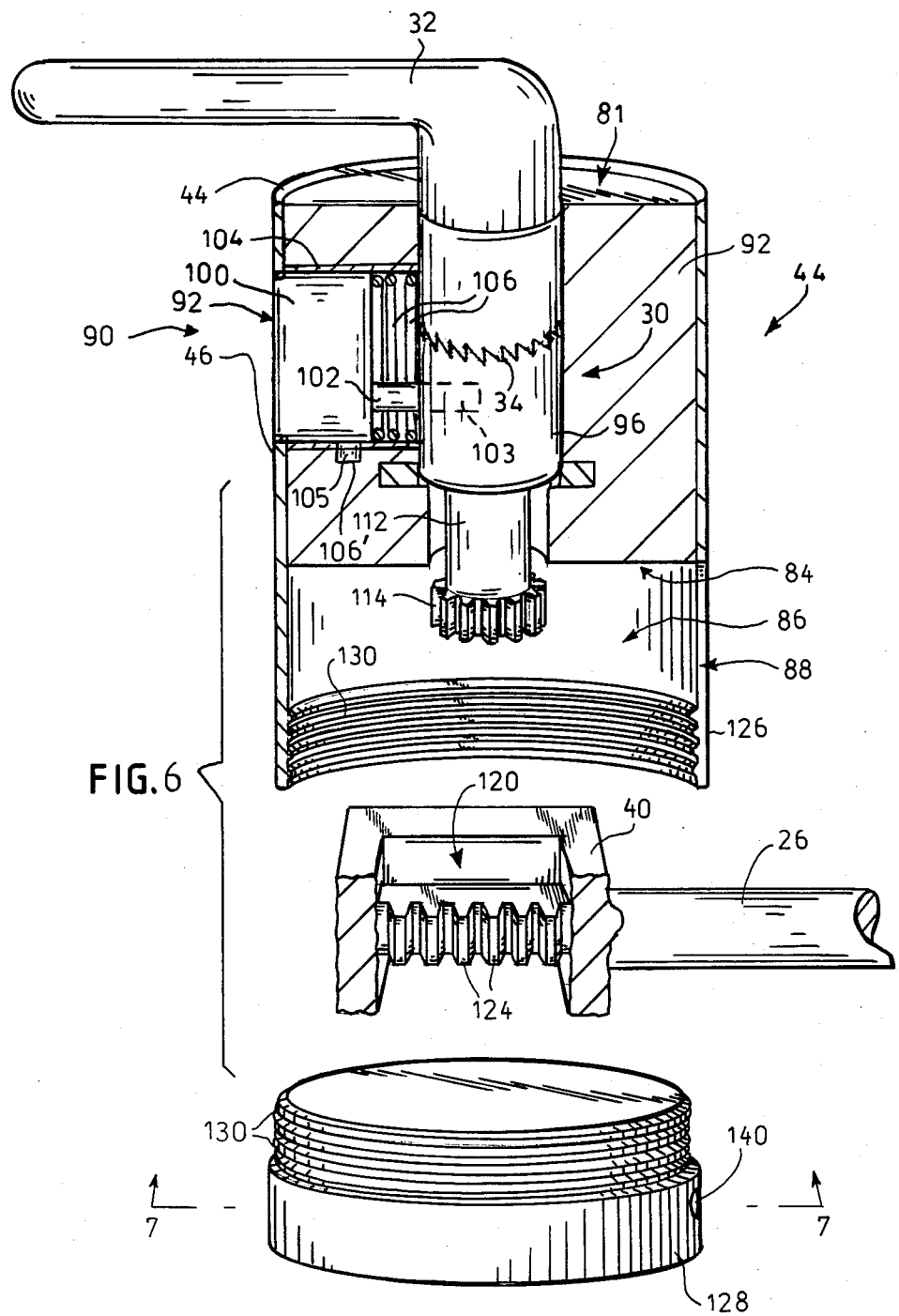
FIG. 6 is an enlarged cross-sectional side view of the lock component shown in FIG. 1, taken apart for viewing.

FIG. 6 is an enlarged cross-sectional (in-part) side view of the locking means assembly 44 shown in FIG. 1 but taken apart for viewing of component parts. The locking means 44 comprises a housing 46 defining an interior chamber having a first zone 84 for the containment of a locking mechanism 30 and a second zone 86 for the containment of the portion of the first extension 40 of the mounting rod 26 having a means for cooperating with the locking mechanism 30 for movement of the locking means 44 along a portion of the first extension 40 length. The housing 46 has an opening 88 for receiving the rod extension 40 into the second zone 86. The locking mechanism 30 includes a rotatable handle 32 at end 81 which functions through a one-way ratchet and pawl means 34 to rotate in one direction only the shaft 96. The rotation permitted is counter-clockwise when the handle 32 is rotated in a clock-wise direction, slippage at the ratchet and pawl means 34 prevents movement of the shaft 96. In this way, the handle 32 facilitates movement of the locking means 44 in one direction (towards the bicycle frame tine) as will be described more fully hereinafter. Rotation of the shaft 96 may be blocked and locked by the lock mechanism 92. The lock mechanism comprises a conventional and standard cylinder lock 100 mounted in the first zone 84 and closing a second opening 90. The cylinder lock 100 includes an integral lock pin 102 extending inwardly. A shaft 96 is rotatably mounted in the zone 84. The shaft 96 has a pawl end for receiving the ratchet of handle 32 to operate the locking means 44 by rotation of shaft 96. An indent 103 receives pin 102 to stop rotation of the shaft 96. Means for releasably maintaining the shaft 96 in a locked, non-rotatable position include the cylinder lock 100 and associated pin 102 which together reciprocate within tube 104 under pressure of spring 106. When the lock 100 and pin 102 are positioned inwardly the pin 102 received in indent 103 holds shaft 96 in a locked position. When the lock 100 and integral pin 102 are withdrawn outwardly, the pin is removed from indent 103 allowing shaft 96 to rotate as described above. A key may be inserted in the cylinder lock 100 to move the lock 100 into an unlocking position, allowing the shaft 96 to freely rotate. The key may also be used to rotate the cylinder lock 100 into a locked position, blocking movement of shaft 96. The cylinder lock 100 is held in a locked position by stop 105, integrally formed thereon to engage with a mortise 106' in the locked position. Thus, the cylinder lock 100 is a conventional pin tumbler cylinder lock fitted within the housing 46 to move in and out. The shaft 96 is modified to include an extended end 112 having a toothed gear end 114. When the locking means 44 is assembled, the extension 112 fits within bore 120 of the extension 40 of rod 26 so that the teeth 114 will engage with mating teeth 124 on the interior bore surface of bore 120. The locking means 44 housing 46 may be assembled by inserting the extension 112 into bore 120 and threading together the upper portion 126 of the housing 46 with the lower portion 128 via mating threads 130. The teeth 124 cooperate with the teeth 114 as a means for moving the locking means 44 along the extended length 40 of the rod 26 when shaft 96 is rotated counter-clockwise as described above.

Figure 8:
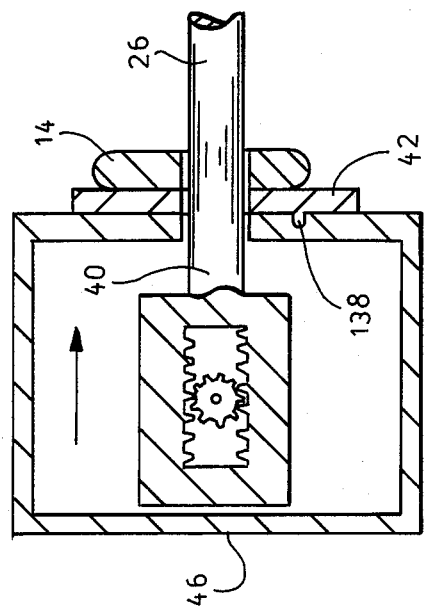
FIG. 8 is a view as in FIG. 7, but with a locked lock component.
Figure 7:
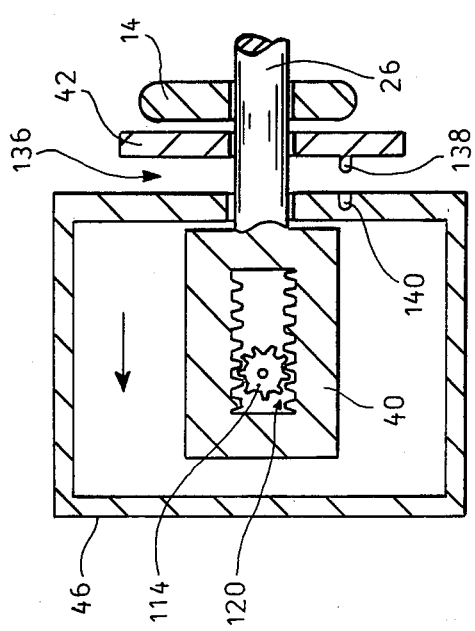
FIG. 7 is a bottom view along lines 7—7 of FIG. 6 when the lock is assembled and unlocked.

Referring now to FIGS. 7 and 8, the operation of the locking means 44 assembly of the invention may be seen. FIG. 7 is a bottom view along lines 7—7 of FIG. 6 when the locking means 44 is assembled and unlocked. As shown, the gear 114 is in a position distally removed from rod 26 carrying with it the extension 112 and the entire housing 46 so that a space 136 appears between housing 46 and spacer 50. In this position, the mounting rod 26 is only loosely held together with the wheel within fork tines 14,16 of the bicycle frame. The wheel is readily removed from this loose connection. The shaft 96 in this position is rotatable by movement of handle 32 and in an unlocked position by counter-clockwise rotation of the shaft 96 with handle 32. Rotation of the shaft 96 carries with it rotation of the integrally structured extension 112 and the carried teeth 114, towards rod 26 as shown in FIG. 8, until the locking means 44 is moved relative to rod 26 into a close and tight association with spacer 42. In this position, wherein the shaft 96 is lockable from rotation, through the agency of cylinder lock 100, sufficient pressure is exerted between the housing 46 and the fork tine 14 to prevent removal of the wheel mounted, between the tines of the frame fork. As also shown in FIG. 8, when so locked the pin 138 on spacer 42 fits into pin receiver 140 on the bottom portion 128 of housing 46 so that this portion 128 is locked and cannot be unthreaded from the upper portion of housing 46 while the assembly is in a locked condition.

In this manner, security of a locked in place wheel is achieved, with minimal potential for removal of the wheel without substantial damage to the bicycle as a whole.

To remove the wheel, one need only unlock the cylinder lock 100 and allow spring 106 to move it together with the integral pin 102 outwardly from engagement with the shaft 96. With shaft 96 in a rotatable condition one can grasp the housing 46 and manually pull the locking means 44 away from the tines 14,16 and spacer 50. In doing so, the gear teeth 114 will walk along the teeth 124, away from rod 26.

FIG. 9 is a cross-sectional view in part of the locking mechanism described above, in the unlocked position and shows further details of the mechanism, including the uncompressed spring 106.

FIG. 10 is a view as in FIG. 9, but with the locking mechanism in a locked position with spring 106 compressed and biased outwardly.

Those skilled in the art will appreciate that many modifications can be made to the preferred embodiments of the invention described above without departing from the spirit and scope of the invention. For example, means can be associated with the mounting rod 26 to releasably lock it with the axle 12, thereby freezing movement of the bicycle wheel and preventing its rotation in the locked mode as an added security device. Means of releasably locking the mounting rod of a bicycle to the enclosing axle are known; see for example the means described in the U.S. Pat. No. 1,150,406, incorporated herein by reference thereto. Thus, a conventional shaft lock can be incorporated into the mounting rod 26 to freeze movement of the axle 12 by modification of the first extended end 40 to accommodate a shaft lock (operable by key). Access to the shaft lock may be facilitated by an access aperture in an appropriate location through the housing 46 and into the second zone 86.

What is claimed is:

1. An assembly for releasably locking a bicycle wheel mounted within the wheel fork of a bicycle frame, said wheel comprising:
   (A) a wheel rim supported on an axle having first and second ends and an axle body between the first and the second axle ends, by integral, spaced apart, first and second wheel hubs located at the first and second axle ends, respectively;
      said axle having an interior axle bore traversing the length of the axle, said bore being open at the first and second ends of the axle;
   (B) first means cooperating with the first hub for partially closing the open bore at the first end of the axle; and
   (C) second means cooperating with the second hub for partially closing the open bore at the second end of the axle;
   which assembly comprises:
      (1) a mounting rod adapted by size and configuration to fit within the axle bore, spanning the length of the axle bore and the integral first and second hubs, said rod having
         (a) a first end;
         (b) a second end;
         (c) a rod body extending continuously between the first and second ends of the rod;
         (d) first means located on the rod body adjacent the first rod end, for cooperating with the first means for partially closing the first end of the axle bore to fixedly mount the rod at the first hub;
         (e) second means located on the rod body adjacent the second rod end, for cooperating with the second means for partially closing the second end of the axle bore to fixedly mount the rod at the second hub;
         said first and second means to fixedly mount the rod, together serving to fixedly mount the rod within the axle bore and the first and second hubs;
      (2) a mounting rod first extension, integral with the first end of the rod and projecting beyond the first hub when the rod is mounted in the axle bore and the first hub, said first extension having a length sufficient to receive thereon one tine of the frame fork, a spacer element and a locking means, said first extension including means for cooperating with said locking means for movement of the locking means along a portion of the first extension length;
      (3) a mounting rod second extension, integral with the second end of the rod and projecting beyond the second hub when the rod is mounted in the axle bore and second hub, said second extension having (a) a length sufficient to receive thereon one tine of the frame fork and means for covering the second extension, (b) a transverse bore through the extension, and (c) a rod stop movably mounted on the second extension so as to move from a first position substantially within the transverse bore to a second position partly within and partly out of the transverse bore, said rod stop having
         (i) a first end;
         (ii) a second end;
         (iii) a mounting point located between the first and the second ends of the rod stop;
      (4) said spacer element being a body adapted by size and configuration to mount on the first rod extension and to space apart the locking means and a tine of the frame fork;
      (5) said means for covering the second extension of the mounting rod comprising
         (a) a housing enclosing and defining an interior chamber of a dimension sufficient to receive and cover the second extension of the mounting rod, said housing having an aperture in one sidewall thereof, of a size and configuration to receive the second extension of the mounting rod into the interior chamber, including the rod stop when in the second position but which will not permit passage of the second extension into said chamber when the rod stop is in the first position; said rod stop being movable from the first to the second position when the rod stop is located within the interior chamber defined by the housing;
         (b) means on the housing for securing the means for covering, over the second extension, in cooperation with the lock; and
         (c) means within the chamber for urging the rod stop, when in the first position, against the housing and towards the first extension of the mounting rod;
      (6) said locking means comprising
         (a) a lock means housing defining an interior chamber having a first zone for the containment of a lock mechanism and a second zone for the containment of the portion of the first extension of the mounting rod having the means for cooperating with the locking means for movement of the locking means along a portion of the first extension length, said housing having a first opening for receiving the first rod extension into the second zone and a second opening into the first zone;
         (b) a lock mechanism mounted in the first zone and closing the second opening, said mechanism including p4 (i) a shaft rotatably mounted in the housing, said shaft having an upper end and a lower end;
         (ii) lock means for releasably maintaining the shaft in a locked, non-rotatable position;

(iii) means for releasing the shaft from the locked, nonrotatable position enabling the shaft to rotate freely; and (iv) ratchet means for rotating the shaft into a locked position by engagement with the shaft upper end;

said shaft lower end being in association with the first extension of the mounting rod for cooperation with the first extension of the mounting rod, whereby when the shaft is rotated to the locked, non-rotatable position the lock housing moves relative to the fixed mounting rod towards the bicycle frame to lock the wheel to the bicycle frame, and whereby when the shaft is released from the locked, non-rotatable position and rotated away from the non-rotatable position, the lock housing moves relative to the fixed mounting rod away from the bicycle frame, releasing and allowing removal of the mounted wheel.

2. The assembly of claim 1 wherein the first means located on the rod body adjacent the first rod end is a screw thread.

3. The assembly of claim 2 wherein the second means located on the rod body adjacent the second rod end is a screw thread.

4. The assembly of claim 1 wherein the means for cooperating with said locking means for movement of the locking means along a portion of the first extension length comprises a transverse bore in the portion, said transverse bore in the portion having teeth on the bore wall.

5. The assembly of claim 1 wherein the transverse bore in the second extension splits the extension into a fork.

6. The assembly of claim 1 wherein the means on the housing for securing the means for covering the second extension comprises a wall of the housing disposed about the aperture in the sidewall.

7. The assembly of claim 1 wherein the means for urging the rod stop comprises a compressible spring.

8. The assembly of claim 1 wherein the means for releasing the shaft comprises a lock key.

9. A kit for releasably locking the wheel of a bicycle into the bicycle frame wheel fork, which comprises;

an assembly as described in claim 1; and means for moving the means for urging the rod stop, away from the first extension of the mounting rod.

* * * * *

UNITED STATES PATENT AND TRADEMARK OFFICE
CERTIFICATE OF CORRECTION

PATENT NO.   : 4,770,011
DATED        : September 13, 1988
INVENTOR(S)  : Guy R. Constant It is certified that error appears in the above—identified patent and that said Letters Patent is hereby corrected as shown below:

Col. 4, line 15; "spoker" should read -- spokes -- .

Col. 8, line 64; "p4" appears to have been inserted in the patent by mistake - it does not appear in the application.

Signed and Sealed this

Twenty-first Day of March, 1989

Attest:

DONALD J. QUIGG

Attesting Officer

Commissioner of Patents and Trademarks